Sept. 29, 1964 T. S. BRISKIN ETAL 3,150,840

TAPE CARTRIDGE

Original Filed April 13, 1961

INVENTORS
THEODORE S. BRISKIN
ROBERT L. MOORE
S. LEE PASTOR
RUDOLPH A. ROM

BY Carpenter, Abbott, Coulter & Kinney
ATTORNEYS

United States Patent Office 3,150,840

Patented Sept. 29, 1964

3,150,840

TAPE CARTRIDGE

Theodore S. Briskin, 1016 N. Ridgedale Drive, Beverly Hills, Calif.; Robert L. Moore, La Grange Highlands, Ill. (320 E. 21st St., Chicago, Ill.); Sheldon Lee Pastor, 2501 Hudson Road, St. Paul, Minn.; and Rudolph A. Rom, Berwyn, Ill. (320 E. 21st St., Chicago, Ill.)

Continuation of application Ser. No. 102,805, Apr. 13, 1961. This application Mar. 30, 1964, Ser. No. 356,358
6 Claims. (Cl. 242—55.13)

This invention relates to improvements in cartridges for magnetic tape or the like.

This application is a continuation of Briskin et al., Serial No. 102,805, filed April 13, 1961.

Certain recent developments in the art of recording and reproducing intelligence by the use of magnetic tape have had as a principal object the provision of a magnetic tape recording and reproducing apparatus which embodies all of the advantages of disc recordings. The application of Pastor et al., Serial No. 102,804, filed April 13, 1961, and assigned to the assignee of the instant application, discloses one form of recording and reproducing apparatus which is operable automatically through threading, playing or recording and rewind operations. In the aforenoted copending application the illustrated tape storage or supply reel is incorporated in a novel cartridge constructed in accordance with the principles of the present invention.

The instant invention contemplates an efficient, compact, readily fabricated cartridge for storing wholly therewithin a magnetic tape having a relatively stiff, normally straight leader attached to the free end thereof. The improved cartridge has an edge opening for passage therethrough of said leader and tape, and is also provided with at least one opening through which external drive means can engage the leader to push the same through said edge opening for travel along a predetermined path provided, for example, by guide means of an associated recording and reproducing apparatus. The instant invention contemplates cartridge structures which are adapted to have rewind actuation of the supply reel effective to rewind the tape and leader thereon applied to the hub portion of said reel, for example by a coaxial spindle, as well as cartridge structures adapted to have rewind actuation applied to the supply reel at its periphery, for example through drive means which may also be engageable with the leader during the initial threading operation.

The invention particularly contemplates a cartridge structure of the last-mentioned type wherein the supply reel is freely rotatably mounted on a shaft which is nonrotatably connected to central portions of the cartridge side walls to thereby maintain said side walls in properly spaced relation against any tendency of said side walls to warp inwardly and create undesired frictional drag on the supply reel. Moreover, this construction permits the use of bearing structures affording reduced friction and freedom from reel wobble, as well as maintenance of the reel in continuously centered relationship within the cartridge container facilitating alignment of the reel with external drive means with which it is adapted to be associated.

The invention further contemplates a cartridge structure provided with retention means tending to prevent inadvertent rotation of the reel when the magnetic tape and the leader are wound on the reel, said means being effective to prevent inadvertent projection of the leader from the cartridge or tangling of the tape as a result of handling. The retention means includes a yieldable brake member engageable with the leader when the latter is wound on the reel but not engageable with the magnetic tape, so it exerts no frictional drag whatever on the reel during transport of the magnetic tape either to or from the cartridge.

The invention can perhaps best be understood by reference to the drawings accompanying and forming a part of this specification wherein.

Figures 1, 2, 3, 4, 5, 6, 7, 8, 9:
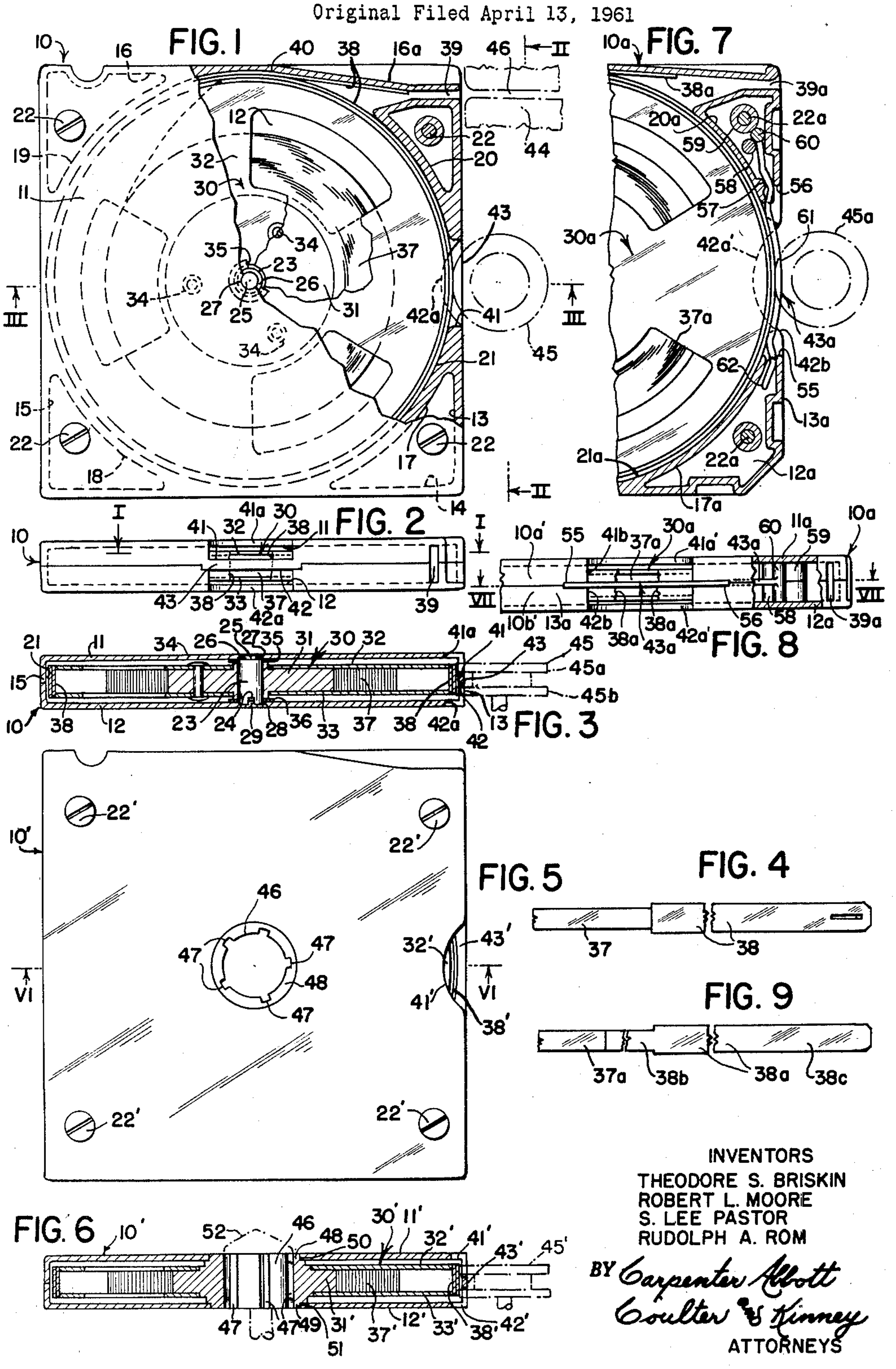
FIGURE 1 is a plan view of one form of the improved cartridge, parts being broken away and shown in section in the plane indicated generally by the line I—I of FIGURE 2.
FIGURE 2 is an edge elevational view taken along the line II—II of FIGURE 1.
FIGURE 3 is a vertical sectional view taken along the line III—III of FIGURE 1.
FIGURE 4 is a fragmentary elevational view of an extent of magnetic tape having a leader attached to the free end thereof in accordance with the principles of the present invention.
FIGURE 5 is a plan view of another form of the improved cartridge.
FIGURE 6 is a vertical sectional view taken along the line VI—VI of FIGURE 5.
FIGURE 7 is a fragmentary sectional plan view of another form of the improved cartridge taken generally along the line VII—VII of FIGURE 8.
FIGURE 8 is a fragmentary edge elevational view similar to FIGURE 2 and showing the cartridge of FIGURE 7, parts being broken away and shown in section.
FIGURE 9 is a view similar to FIGURE 4 and showing a magnetic tape having another form of leader attached to the free end thereof.

Referring more particularly to FIGURES 1 to 3 of the drawings, the form of the improved cartridge selected for illustration therein comprises a shallow container 10 having spaced opposing side walls 11 and 12 which may be rectangular. The side walls 11 and 12 are connected at their edge portions by edge walls 13, 14, 15 and 16, and the container 10 is also provided with arcuate wall portions 17, 18, 19 and 20 which connect the side walls 11 and 12, and with the edge walls 13 to 16 define a cylindrical cavity within the container 10 between the side walls 11 and 12, said cavity having a cylindrical wall surface 21.

As shown most clearly in FIGURE 2, the container 10 may be formed of a pair of complementary shells, for example of a suitable plastic material, which shells are held in assembled relation by suitable means such as the screws 22 shown in FIGURE 1. As shown most clearly in FIGURE 3, a shaft or rod 23, for example of metal or suitable plastic material, extends between the side walls 11 and 12 coaxially with the cylindrical cavity wall 21. The shaft 23 may be formed with a diametrical kerf 24 at one end and with a reduced diameter portion 25 affording an annular shoulder 26 at its other end. The side wall 11 is formed with a bore 27 to receive the reduced diameter end portion 25 of the shaft 23, and the side wall 12 is formed with a coaxial circular recess 28 to receive the other end of said shaft. The recess 28 may be formed with a diametrical rectangular rib 29 which interfits with the kerf 24 to prevent rotation of the shaft 23. It will be observed that the side wall 11 engages the annular shoulder 26 and that the opposite end of the shaft 23 is seated against the bottom of the recess 28 to define a fixed minimum spacing between central portions of the side walls 11 and 12. The shaft 23 may, if desired, have a snug or press fit within the bore 26 and recess 28 normally preventing any relative movement between said side wall portions and said shaft.

Freely rotatably mounted on the shaft 23 within the container 10 is a tape storage or supply reel 30 comprising a hub 31 and a pair of spaced parallel apertured circular side flanges 32 and 33. The hub 31 may be of suitable plastic material, and the side flanges 32 and 33 may be flat metal stampings. The flanges 32 and 33 are coaxially fixed to opposite sides of the hub 31, as by rivets 34. If desired the reel 30 may be of one piece molded plastic. Flat metal washers 35 and 36 may be interposed between the hub 31 and the side walls 11 and 12 respectively as shown.

Reel 30 is adapted to have a relatively limp magnetic recording tape 37 wound thereon between the flanges 32 and 33. An example of one type of magnetic recording tape which is contemplated for use in the improved cartridge is one in which the backing or carrier film takes the form of tensilized polyethylene terephthalate .0005 inch thick and .150 inch wide. Tensilized polyethylene terephthalate film is marketed commercially under the trademark "Mylar." The illustrated tape 37 has a relatively stiff, normally straight leader 38 attached to the free end thereof. The leader may take the form of a flat band of flexible plastic material of sufficiently heavy gauge to impart substantial stiffness thereto. The presently preferred leader is made of polyethylene terephthalate .010 inch thick and .238 inch wide. Whereas the tape 37 has a width less than the spacing between the reel flanges 32 and 33 permitting accommodation of said tape between said flanges as shown, the leader 38 has a width greater than the spacing between said reel flanges and is wound on the peripheries of said flanges as shown in FIGURES 1 to 3. The diameter of the reel 30 is sufficiently smaller than the diameter of the cylindrical wall surface 21 to provide an annular space for accommodation of the leader wholly within the container 10 when wound on the peripheries of the reel flanges.

In order to provide for travel of the leader 38 and tape 37 out of and into the container 10, the edge wall 13 is formed with an opening or passage 39 and the edge wall 16 is formed with a portion 16*a* which defines one side of the opening 39 and extends into tangency with the cylindrical wall surface 21, as at 40. The edge wall portion 16*a* provides means for guiding the free end of the leader 38 toward the opening 39 when the reel 30 is rotated in a clockwise direction tending to unwind said leader. The illustrated container 10 is also formed with at least one edge wall opening exposing the peripheries of the reel flanges 32 and 33 as well as the outer surface of the wound leader 38. It is preferred to form the container with a pair of spaced edge wall openings 41 and 42, said openings having arcuate portions 41*a* and 42*a* extending into the adjacent side walls 11 and 12, respectively, as shown. The openings 41 and 42 expose peripheral portions of the reel flanges as well as the edge portions of the leader 38 overlaying said peripheral portions. It will be observed that a portion 43 of the edge wall 13 spans the openings 41 and 42 to afford continuity of the cylindrical wall surface 21 at said openings, permitting the free end of the leader 38 to move therepast in an unwinding direction without jamming.

The improved cartridge is adapted for use in a recording-reproducing apparatus having tape and leader guide means shown fragmentarily in dot and dash lines at 44 and also having a drive roller shown in dot and dash lines at 45. The guide means 44 defines a channel or path 46, and when the cartridge is in operative position, the opening 39 thereof is aligned with the mouth of the channel 46 as shown. As shown in FIGURE 3, the drive roller 45 may be of the type having a reduced diameter central portion defining spaced upper and lower flange portions 45*a* and 45*b*. The drive roller 45 is preferably of resilient or rubber-like material and the flanges 45*a* and 45*b* thereof are adapted to extend into the openings 41 and 42 respectively to engage the upper and lower edge portions of the outer surface of the leader 38 as shown.

To initiate threading of the leader and tape through the associated recording and reproducing apparatus, counterclockwise drive-out rotation is imparted to the drive roller 45 by suitable means (not shown), and the frictional engagement thereof with the outer surface of the leader 38 pushes said leader in the direction to rotate the reel 30 clockwise, whereupon the free end of the leader 38 is projected through the opening 39 and into the channel 46 of the guide means 44. The leader 38 is pushed by the drive roller 45 along a predetermined path to the take-up reel (not shown) which is provided with suitable means (not shown) for effecting winding engagement of said leader thereon. FIGURE 4 shows a perforated leader 38 for coaction with one type of winding means, whereas FIGURE 9 shows an unperforated leader 38*a* for coaction with another type of winding means at the take-up reel. Upon winding of the leader on the take-up reel, the drive for the roller 45 may be disengaged and withdrawal of the leader and of the tape 37 from the cartridge is thereafter effected by suitable capstan-pressure roller means (not shown).

To rewind the tape and the leader wholly into the cartridge, clockwise rewind rotation is imparted to the roller 45 by the drive means therefor. Frictional engagement of the roller 45 with the peripheral surfaces of the reel flanges 32 and 33 causes counterclockwise rotation of reel 30 and rewinding of the tape, and thereafter the leader, onto said reel. After the leader and tape are rewound wholly within the container 10, the rewind drive for the roller 45 may be disengaged and the cartridge removed from the recording and reproducing apparatus and stored. With the improved cartridge it is unnecessary that the reel or the leader come to rest in any particular position at the end of the rewind operation, since irrespective of the position of the free end of the leader within the cartridge, counterclockwise rotation of the roller 45 causes said leader end to be guided toward and through the opening 39. Due to the normally straight character of the leader 38, the tendency of the wound leader to straighten out causes the free end thereof to travel in contact with the cylindrical surface 21 and thence along the inner surface of the container edge wall portion 16*a* to the opening 39 from which it is projected along a straight line path into the channel 46.

The improved cartridge provides a low friction wobble-free mounting for the reel 31 maintaining said reel in centered position within the container 10 facilitating alignment of said reel and thereby of the leader 38 and tape 37 with the guide means 44 and drive roller 45 of an associated recording and reproducing apparatus. By virtue of the seating of the center shaft 23 in the recess 28 and the engagement of annular shoulder 26 of said shaft with the side wall 11 as shown, said shaft defines the minimum spacing between the side walls 11 and 12 thereat, and therefore said side walls are prevented from warping inwardly to create a frictional drag on the reel 30.

FIGURES 5 and 6 illustrate another form of cartridge constructed in accordance with the principles of the present invention. The elements indicated in FIGURES 5 and 6 by primed reference characters correspond to the elements in FIGURES 1 to 3 indicated by the same reference characters unprimed. The cartridge of FIGURES 5 and 6 may be identical in all respects with the cartridge of FIGURES 1 to 3, except for the reel hub structure and the mounting of the reel.

Referring more particularly to FIGURES 5 and 6, the hub 31′ may be of metal and is formed with a central bore 46 provided with a plurality of axially extending rectangular grooves 47. The hub 31′ is also formed with coaxial tubular extensions 48 and 49 affording journals for the reel 30′ and the side walls 11′ and 12′ are formed with coaxial bores 50 and 51 to provide bearings for the journals 48 and 49 respectively, and thereby a rotatable mounting for the reel 30′.

The cartridge of FIGURES 5 and 6 is adapted for use in recording and reproducing apparatus having a spindle head indicated in dot and dash lines at 52 in FIGURE 6 adapted to fit into and have a driving connection within the bore 46 and grooves 47. In such apparatus, the roller 45′ is utilized only to effect pushing or drive-out of the leader 38′, rewind actuation being imparted to the reel 30′ through the spindle head 52. The cartridge of FIGURES 5 and 6 may be used interchangeably with the cartridge of FIGURES 1 to 3 on recording and reproducing apparatus adapted for use with the latter cartridge.

FIGURES 7 and 8 illustrate still another form of cartridge constructed in accordance with principles of the present invention. The elements indicated in FIGURES 7 and 8 by reference characters which are primed and/or which bear subscripts, correspond to the elements of FIGURES 1 to 6 indicated by the same base reference characters. The catridge of FIGURES 7 and 8 may be identical in all respects with the cartridge of FIGURES 1 to 3 except as shown.

Referring more particularly to FIGURES 7 and 8, it will be observed that in the container 10*a* the edge openings 41*b* and 42*b* are not separated by a portion of the wall 13*a* as the openings 41 and 42 are separated by the wall portion 43 in FIGURES 1 to 3. Rather, the edge openings 41*b* and 42*b* in wall 13*a* combine to form a single edge opening extending completely across said wall to afford access to the interior of the container 10*a* for driving engagement of the leader 38*a* and reel 30*a* by a drive roller shown in dot and dash lines at 45*a* and which may be identical in shape with drive roller 45.

Retention means is provided for preventing inadvertent rotation of the reel 30*a* when the magnetic tape 37*a* and leader 38*a* are wound thereon as shown, said means also effectively affording continuity of the cylindrical wall surface 21*a* at the opening 41*b*, 42*b* preventing jamming or exit of the leader 38*a* at said opening. In the form of the invention illustrated in FIGURES 7 and 8 said retention means comprises a yieldable brake member 43*a* having a narrow elongated arcuate yieldable body portion 61 circumferentially spanning the opening 41*b*, 42*b* and effectively affording continuity of the cylindrical surface 21*a* midway between the walls 11*a* and 12*a*. The edge wall 13*a* is formed with slots 55 and 56 in which the member 43*a* is accommodated.

The slot 55 affords an opening between the wall 13*a* and arcuate wall 17*a* into which one end of the body portion 61 extends, terminating in a free floating offset portion 62 disposed between the walls 13*a* and 17*a*. The slot 56 affords an opening between the wall 13*a* and arcuate wall 20*a* as shown and into which the other end of the body portion extends, terminating in a transversely extending cylindrical head 60 shown most clearly in FIGURE 8. The opposite ends of the head 60 abut the side walls 11*a* and 12*a*, and said head is locked against transverse movement by abutment with the wall 13*a*, a transversely extending fixed shaft or pin 58 and a transversely extending fixed tubular member 59 as shown. The shaft or pin 58 and tubular member 59 may be integral with the container 10*a*. As shown, the body portion 61 extends from the head 60 and has a snug fit between a protuberance 57 on the wall 20*a* and the portion of the wall 13*a* at the margin of the slot 56. The locking of the head 60, together with the aforementioned snug fit of the portion 61 between the protuberance 57 and wall 13*a* rigidly holds the adjacent end of the member 43*a*.

The arcuate body portion 61 is shaped to normally extend radially inwardly of the cylindrical wall 21*a* and into the annular space between said wall and the peripheries of the reel flanges, said normal position (not shown) being defined by engagement of the terminal portion 62 with the wall 17*a*. When the leader 38*a* is wound on the peripheries of the reel flanges as shown, the arcuate body portion 61 is engaged by said leader and pressed outwardly, for example to the position shown. The body portion 61 is inherently resilient, and when thus engaged, exerts a radially inwardly directed force, as well as a frictional drag on the leader 38*a*, pressing the same against the reel 30*a* and tending to prevent movement of the leader and of the reel when the tape 37*a* and leader 38*a* are contained wholly within the container 10*a* as shown.

The member 43*a* permits engagement of the leader 38*a* by a drive roller 45*a* similar to the drive roller 45. As the leader 38*a* is unwound from the reel 30*a* and projected from the opening 39*a*, the body portion 61, by virtue of its resilience, returns inwardly. Upon movement of the leader 38*a* completely out from under the portion 61 of member 43*a*, said portion 61 is returned to its normal position aforementioned. In its normal position the member 43*a* does not contact either the reel 30*a* or the magnetic tape 37*a*, so that at all times during transport of said magnetic tape, member 43*a* exerts no frictional drag whatever upon said reel or tape.

In the illustrated form of the invention, the member 43*a* is molded in one piece from a tough resilient plastic material such as an acetal resin, one suitable form of which is sold commercially under the trademark "Delrin." Within the inventive concept, however, the retention means may take other forms than that illustrated. More specifically the member 43*a* may be made of other suitable resilient materials, for example spring steel, and it may also take another specific shape best suited to the utilization of a specific material therein.

Referring to FIGURE 9, it will be observed that the leader 38*a* has a tail portion 38*b* of the same width as the tape 37*a*, the major portion 38*c* of said leader being the same width as the leader 38. The portion 38*b* of the leader 38*a* is wound on the reel 30*a* between the flanges thereof and provides effective centering of the portion 38*c* on the reel when said portion is wound on the peripheries of said flanges.

While the improved cartridge is described and claimed in association with magnetic recording tape, it nevertheless has utility in other applications. Therefore, wherever magnetic tape is referred to herein, it is intended that such expression is to cover other tapes, sheets or bands with which the improved cartridge may have utility.

Having thus described two forms of the improved cartridge, it is expressly understood that the illustrated forms were selected to facilitate the disclosure and are not intended to place unnecessary limitations on the claims or to confine the invention to a particular use. Various changes and modifications may be made in the forms of the invention illustrated without departing from the spirit of the invention, and all of such changes are contemplated as may come within the scope of the appended claims.

What is claimed as the invention is:

1. A tape cartridge or the like comprising in combination a shallow container having spaced opposite side walls and edge wall means, said edge wall means connecting edge portions of said side walls and defining a substantially cylindrical cavity within said container, a reel rotatably located within said cylindrical cavity and having spaced parallel circular side flanges which have a diameter less than that of said cavity to provide an annular space between the peripheries of said side flanges and said edge wall means of said container when the reel is positioned centrally within said cavity, a tape wound on said reel between said side flanges, a stiff leader attached to the free end of said tape, said leader having a wide portion of greater width than the spacing between said side flanges and wound on the outermost peripheral edge portions of said flanges within said annular space beyond said peripheral edge portion, the free end of said wound leader bearing against said edge wall means, said edge wall means being formed to define a passage therethrough, which communicates with said annular space and which is so oriented that movement of said wound leader in an unwinding direction projects the free end of the leader through said passage, said container being formed with a peripheral opening exposing a portion of said reel flanges and the outer surface of said wound leader, and means to provide continuity of said edge wall means at said opening and to afford engagement with said leader and said reel flanges by external drive means while permitting the free end of said leader to be driven past said opening in an unwinding direction.

2. A tape cartridge or the like comprising in combination a shallow container having spaced opposite side walls and edge wall means, said edge wall means connecting edge portions of said side walls and defining a substantially cylindrical cavity within said container, a rotatable reel journaled substantially coaxially within said cylindrical cavity and having spaced parallel circular side flanges which have a diameter less than that of said cavity to provide an annular space between the peripheries of said side flanges and said edge wall means of said container, said annular space being adapted to accommodate a stiff tape leader wound on the outermost peripheral edge portion of said flanges and spanning the space therebetween, said edge wall means being formed to define a passage therethrough which communicates with said annular space and which is so oriented that movement of a said wound leader in an unwinding direction projects the free end of the leader through said passage, said container being formed with a peripheral opening exposing a portion of said reel flanges and the outer surface of a said wound leader, and means to provide continuity with said edge wall means at said opening and to afford engagement with said leader and said reel flanges by external drive means while permitting the free end of said leader to be driven past said opening in an unwinding direction.

3. A tape cartridge or the like comprising in combination a shallow container having spaced opposite side walls and edge wall means, said edge wall means connecting edge portions of said side walls and defining a substantially cylindrical cavity within said container, a reel having spaced parallel circular side flanges which have a diameter less than that of said cylindrical cavity, means journalling said reel within said cavity and providing an annular space between the peripheries of said side flanges and said edge wall means, a tape wound on said reel between said side flanges, a stiff leader attached to the free end of said tape, said leader having a wide portion of greater width than the spacing between said side flanges and wound on the outermost peripheral edge portions of said flanges within said annular space beyond said peripheral edge portions, the free end of said wound leader bearing against said edge wall means, said edge wall means being formed to define a passage therethrough which communicates with said annular space and which is so oriented that movement of said wound leader in an unwinding direction projects the free end of the leader through said passage.

said container being formed with a peripheral opening exposing a portion of said reel flanges and the outer surface of said wound leader, and retention means spanning said opening to provide continuity with said edge wall means at said opening and to afford engagement with said leader and said reel flanges by external drive means while permitting the free end of said leader to be driven past said opening in an unwinding direction.

4. A tape cartridge as defined in claim 3 wherein said journalling means comprises a shaft connected to central portions of said side walls to provide a predetermined spacing between said central portions.

5. A tape cartridge as defined in claim 3 wherein said reel has axially extending hub portions journalled in the central portions of said side walls and is formed to provide a predetermined minimum spacing between said central portions.

6. A tape cartridge as defined in claim 3 wherein said retention means comprises a narrow yieldable brake member frictionally engaging the outer surface of said wound leader to press the same against said peripheral edge portions, said brake member being adapted to limit movement of said reel when said tape and leader are wound thereon.

No references cited.